United States Patent [19]

Konig et al.

[11] Patent Number: 4,571,265

[45] Date of Patent: Feb. 18, 1986

[54] PROCESS FOR SEPARATION AND PURIFICATION OF PLATINUM GROUP METALS (II)

[75] Inventors: Karl-Heinz Konig, Frankfurt; Michael Schuster, Frankfurt-Harheim; Dieter Hollmann, Darmstadt; Rainer Schlodder, Rodenbach, all of Fed. Rep. of Germany

[73] Assignee: Degussa Aktiengesellschaft, Frankfurt, Fed. Rep. of Germany

[21] Appl. No.: 667,892

[22] Filed: Nov. 2, 1984

[30] Foreign Application Priority Data

Nov. 5, 1983 [DE] Fed. Rep. of Germany ....... 3340056

[51] Int. Cl.⁴ .............................................. C22B 11/04
[52] U.S. Cl. ......................................... 75/108; 423/22; 423/42; 423/101; 423/140; 75/118 R; 75/119; 75/117; 75/120; 75/121; 210/725; 210/729; 564/23
[58] Field of Search ............. 423/22, 24, 42, 100, 423/101, 139, 140; 75/121, 118 R, 108, 119, 120, 117, 101 BE; 564/23; 210/725, 729

[56] References Cited

U.S. PATENT DOCUMENTS

| | | | |
|---|---|---|---|
| 2,342,785 | 2/1944 | Block et al. | 564/23 |
| 3,748,356 | 7/1973 | Willinga et al. | 564/23 |
| 3,994,719 | 11/1976 | Corte et al. | 423/22 |
| 4,368,073 | 1/1983 | Breister et al. | 75/118 R |

FOREIGN PATENT DOCUMENTS 1230011 12/1966 Fed. Rep. of Germany ........ 564/23

*Primary Examiner*—John Doll
*Assistant Examiner*—Robert L. Stoll
*Attorney, Agent, or Firm*—Cushman, Darby & Cushman

[57] ABSTRACT

There is described a process for the separation and purification of the platinum group metals from base metal out of acidic aqueous solutions. For this purpose there is used a substituted thiourea of the formula

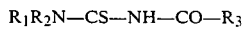

or

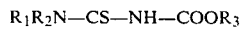

as the precipitation agent. Preferably there are employed N,N-diaklyl-N'-benzoylthiourea wherein $R_1$ and $R_2$ are methyl, n-butyl, or n-hexyl.

20 Claims, No Drawings

PROCESS FOR SEPARATION AND PURIFICATION OF PLATINUM GROUP METALS (II)

RELATED APPLICATION

This application is related to a Konig et al application filed on even date and claiming the benefit of German priority application No. P3340055.5-24.

BACKGROUND OF THE INVENTION

The invention is directed to a process for the separation and purification of platinum group metals from base metals from aqueous, acidic solutions by precipitation with an organic substance, separating and working up the precipitate.

The processes known at the present time for the separation and purification of the platinum group metals platinum, palladium, rhodium, ruthenium, iridium, and osmium from acidic, aqueous solutions which also contain base metals require a large number of individual process steps and are very time consuming. Besides the difficulties increase in the known processes for separating platinum metals with the number of such metals and the base metals present such as copper, iron, nickel, cobalt, zinc, or manganese.

Known processes operate in part with organic precipitation and extraction agents, such as, e.g. mercaptopyridine-N-oxide (U.S. Pat. No. 4,368,073), but these reagents are frequently only slightly specific or not usable in general for all platinum group metals.

Therefore it was the problem of the present invention to provide a process for the separation and purification of platinum group metals from base metals and to separate the platinum group metals from each other from aqueous, acidic solutions by precipitation with an organic material, separating and working up the precipitate with which in a simple manner, there are separated and purified as quantitatively as possible all platinum group metals.

SUMMARY OF THE INVENTION

This problem was solved according to the invention by employing as the original material a substituted thiourea of the general formula

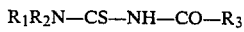

or

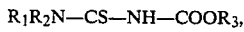

wherein $R_1$, $R_2$, and $R_3$ are substituted or unsubstituted alkyl, aryl, or aralkyl groups, at a pH below 4 and at a temperature between 15° and 100° C. The precipitation can be carried out at a temperature as high as 110° C., e.g. 80° to 110° C.

Thus $R_1$, $R_2$, and $R_3$ can be methyl, ethyl, propyl, isopropyl, n-butyl, sec.butyl, n-amyl, n-hexyl, n-octyl, n-decyl, n-dodecyl, n-octadecyl, phenyl, tolyl, or benzyl.

Illustrative compounds include:
N,N-dimethyl-N'-acetyl thiourea
N,N-diethyl-N'-acetyl thiourea
N-methyl-N-ethyl-N'-acetyl thiourea
N,N-diethyl-N'-acetyl thiourea
N,N-dipropyl-N'-acetyl thiourea
N,N-dibutyl-N'-acetyl thiourea
N,N-dihexyl-N'-acetyl thiourea
N,N-dioctyl-N'-acetyl thiourea
N,N-dimethyl-N'-propionyl thiourea
N,N-diethyl-N'-propionyl thiourea
N,N-dibutyl-N'-propionyl thiourea
N,N-dihexyl-N'-propionyl thiourea
N,N-dimethyl-N'-butyryl thiourea
N,N-diethyl-N'-butyryl thiourea
N,N-dibutyl-N'-valeroyl thiourea
N,N-dihexyl-N'-butyryl thiourea
N,N-didecyl-N'-acetyl thiourea
N,N-dibenzyl-N'-acetyl thiourea
N,N-diphenyl-N'-acetyl thiourea
N,N-diphenyl-N'-butyryl thiourea
N,N-diphenyl-N'-benzoyl thiourea
N,N-diphenyl=N'-hexanoyl thiourea
N,N-dimethyl-N'-stearoyl thiourea
N,N-dimethyl-N'-benzoyl thiourea
N,N-diethyl-N'-benzoyl thiourea
N,N-dibutyl-N'-benzoyl thiourea
N,N-dihexyl-N'-benzoyl thiourea
N,N-didoceyl-N'-benzoyl thiourea
N,N-dimethyl-N'-carbomethoxy thiourea
N,N-diethyl-N'-carbomethoxy thiourea
N,N-diethyl-N'-phenacetyl thiourea
N,N-dibutyl-N'-carbomethoxy thiourea
N,N-dihexyl-N'-carbomethoxy thiourea
N,N-dimethyl-N'-carboethoxy thiourea
N,N-diethyl-N'-carboethoxy thiourea
N,N-dipropyl-N'-carboethoxy thiourea
N,N-dibutul-N'-carboethoxy thiourea
N,N-dihexyl-N'-carboethoxy thiourea
N,N-dioctyl-N'-carboethoxy thiourea
N,N-didecyl-N'-carboethoxy thiourea
N,N-diphenyl-N'-carboethoxy thiourea
N,N-dimethyl-N'-carbopropoxy thiourea
N,N-diethyl-N'-carbobutoxy thiourea
N,N-diethyl-N'-carbohexoxy thiourea
N,N-dimethyl-N'-carbophenoxy thiourea
N,N-diethyl-N'-carbophenoxy thiourea Preferably there is used a thiourea in which $R_1$ and $R_2$ each is a methyl, n-butyl, or n-hexyl group and $R_3$ is a phenyl group. These N,N-dialkyl-N-benzoyl thioureas are readily prepared from the corresponding secondary amines, benzoyl chloride and potassium thiocyanate.

In using N,N-dialkyl-N'-carboalkoxy thioureas $R_3$ is preferably a methyl or ethyl group. The synthesis is carried out from the corresponding secondary amines, chloroformic acid ester and potassium thiocyanate. As solvent there can be used aliphatic or aromatic compounds, preferably xylene, chloroform, or toluene.

Preferably, the platinum group metals are precipitated from aqueous, especially hydrochloric acid solutions, by adding an alcoholic solution of the thiourea compound to the hydrochloric acid solution. These thioureas are difficultly soluble in water or dilute acids. The precipitating agent is added in stiochiometric excess. Thereby, one starts from a complex forming reaction, for example of the form

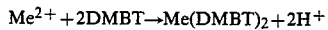

(DMBT=N,N-dimethyl-N'-benzoyl thiourea). The metal complexes are difficultly soluble in aqueous hydrochloric acid solution and form a finely crystalline, readily filterable precipitate.

The platinum group metals separated off according to this process can be worked up according to known processes, for example by calcining, and can also be separated from each other. The elements copper and iron which likewise precipitate in the acid pH range can be dissolved again by digesting the precipitate in hot, 3 molar sulfuric acid, while the complexes of the platinum group metals are insoluble in 3 molar sulfuric acid.

Depending on the composition of the acid solutions by selection of the pH and the temperature there can also be separated off individual platinum group metals specifically from all the other members of the group.

The following table shows the pH range in which several of the corresponding metal chelates can be precipitated, applicable for N,N-dimethyl-N'-benzoyl thiourea (DMBT) at metal concentrations of $10^{-2}$ mol/l

|  | pH-Range Extraction |  |
| --- | --- | --- |
| $Pt^{II}$ | 1-9 | From these values |
| $Pt^{IV}$ | 1-9 | there can be |
| $Pd^{II}$ | 0-14 | selected the respec- |
| $Ru^{III}$ | 1-4 | tive separation |
| $Rh^{III}$ | 1-14 | parameters for a |
| $Os^{III}$ | 1-11 | given solution |
| $Ir^{III}$ | 2-12 |  |
| $Ag^{I}$ | 1-6 |  |
| $Cu^{II}$ | 0-7 |  |
| $Co^{III}$ | 5.5-10 |  |
| $Ni^{II}$ | 4.5-11 |  |
| $Zn^{II}$ | 5-9 |  |

Also, the remaining complexible base metal, as e.g. lead or cadmium are only precipitated at a pH above 4.

Unless otherwise indicated all parts and percentages are by weight.

The process can comprise, consist essentially of, or consist of the stated steps with the recited materials.

The following examples explain the process of the invention in more detail.

EXAMPLE 1

50 ml of a 3 molar hydrochloric acid solution having the composition 2.0 g/l Pt, 1.8 g/l Pd, 0.5 g/l Rh, 0.8 g/l Ir, 0.05 g/l Ru, 0.05 g/l Os, 0.6 g/l Cu, 4.8 g/l Fe, 1.0 g/l Ni, 0.6 g/l Zn, 0.4 g/l Co, and 0.2 g/l Mn were adjusted to a pH of 2.5 by addition of dilute NaOH with vigorous stirring. 40 ml of N,N-di-n-methyl-N'-benzoyl-thiourea (DHBT) (75 g/l) were added with stirring and the mixture heated to boiling for 20 minutes. The precipitate formed which contained the platinum group metals, copper and iron, was filtered off with suction and washed with water. The filtrate was free from platinum group metals and copper.

By suspending the precipitate in hot, 3 molar sulfuric acid the DMBT complexes of copper and iron were completely dissolved so that the precipitate now only contained platinum group metals. The sulfuric acid employed to wash out the copper and iron was free from platinum group metals ($<10$ ppm).

The residual precipitate was calcined, the calcined product dissolved in aqua regia and worked up.

EXAMPLE 2

500 ml of a 2 molar aqueous hydrochloric acid solution having the composition 0.2 g/l Pt, 0.35 g/l Pd, 0.47 g/l Rh, 0.08 g/l Ir, 0.01 g/l Ru, 0.86 g/l Cu, and 0.45 g/l Fe (remainder of base metals ($<0.1$ g/l) were adjusted to a pH of 2.5 by addition of dilute aqueous sodium hydroxide. There were added with stirring 150 ml of an ethanolic solution of N,N-dimethyl-N'-benzoyl thiourea (75 g/l) and the mixture heated to boiling for 20 minutes.

The precipitate formed which contained the platinum group metals, copper and iron, was treated further in the same manner as in Example 1 to obtain the platinum group metals free from copper and iron.

The entire disclosure of German priority application P3350056.3 is hereby incorporated by reference.

What is claimed is:

1. In a process for the separation and purification of the platinum group metals from base metals from aqueous, acid solutions by precipitation with an organic material, separating and working up the precipitate, the improvement comprising employing as the precipitating agent a thiourea of the formula

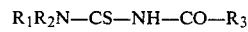

or

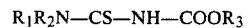

where $R_1$, and $R_2$, and $R_3$ are substituted or unsubstituted alkyl, aryl, or aralkyl groups at a pH below 4 and a temperature between 15° and 110° C.

2. A process according to claim 1 wherein $R_1$, $R_2$, and $R_3$ are unsubstituted alkyl, aryl, or aralkyl group.

3. A process according to claim 2 wherein the substituted thiourea has the formula $R_1$, $R_2$ N—CS—NH—CO—$R_3$.

4. A process according to claim 3 wherein $R_1$ and $R_2$ are lower alkyl and $R_3$ is phenyl.

5. A process according to claim 4 wherein $R_1$ and $R_2$ are alkyl of 1–6 carbon atoms.

6. A process according to claim 5 wherein $R_1$ and $R_2$ are methyl, n-butyl, or n-hexyl.

7. A process according to claim 6 where $R_1$ and $R_2$ are methyl.

8. A process according to claim 6 wherein $R_1$ and $R_2$ are n-butyl.

9. A process according to claim 6 wherein $R_1$ and $R_2$ are n-hexyl.

10. A process according to claim 2 wherein the substituted thiourea has the formula $R_1R_2N$—CS—NH—COOR$_3$.

11. A process according to claim 10 wherein $R_1$, $R_2$, and $R_3$ are all lower alkyl groups.

12. A process according to claim 11 wherein $R_1$, $R_2$, and $R_3$ are alkyl of 1 to 6 carbon atoms.

13. A process according to claim 12 where $R_1$ and $R_2$ are methyl or ethyl groups.

14. A process according to claim 13 wherein the platinum group metals present include at least one member of the group consisting of Pt, Pd, Ru, Rh, Os, and Ir.

15. A process according to claim 14 wherein there is also present at least one base metal selected from the group consisting of Ag, Cu, Co, Ni, and Zn.

16. A process according to claim 2 wherein the precipitation is carried out from aqueous hydrochloric acid at a temperature between 80° and 100° C.

17. A process according to claim 16 wherein the organic material employed is added in alcohol.

18. A process according to claim 2 wherein the organic material employed is added in alcohol.

19. A process according to claim 2 wherein the organic material employed is added as a solution in a water soluble liquid, the complex of noble metal and substituted thiourea being insoluble in the acid.

20. A process according to claim 19 wherein the acid is hydrochloric acid.

* * * * *